United States Patent
Pocas et al.

(10) Patent No.: US 12,081,663 B2
(45) Date of Patent: Sep. 3, 2024

(54) KEY MANAGEMENT AND KEY POLICIES FOR DATA ENCRYPTION IN A STORAGE APPLIANCE

(71) Applicant: EMC IP Holding Company LLC, Hopkinton, MA (US)

(72) Inventors: Jamie Pocas, Milford, MA (US); Radia J. Perlman, Redmond, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 256 days.

(21) Appl. No.: 17/160,981

(22) Filed: Jan. 28, 2021

(65) Prior Publication Data

US 2022/0239478 A1    Jul. 28, 2022

(51) Int. Cl.
*H04L 9/08*    (2006.01)
*H04L 9/14*    (2006.01)

(52) U.S. Cl.
CPC .......... *H04L 9/0891* (2013.01); *H04L 9/0825* (2013.01); *H04L 9/0894* (2013.01); *H04L 9/14* (2013.01)

(58) Field of Classification Search
CPC ... H04L 9/0891; H04L 9/0825; H04L 9/0894; H04L 9/14
USPC .......................................................... 713/171
See application file for complete search history.

(56) References Cited

U.S. PATENT DOCUMENTS

| | | | |
|---|---|---|---|
| 2016/0239674 A1* | 8/2016 | Bao | H04L 63/0876 |
| 2018/0096164 A1* | 4/2018 | Dageville | G06F 21/6227 |
| 2018/0241561 A1* | 8/2018 | Albertson | H04L 63/06 |
| 2019/0095651 A1* | 3/2019 | Yokoi | G06F 3/0647 |
| 2022/0182232 A1* | 6/2022 | Marson | H04L 9/16 |

* cited by examiner

*Primary Examiner* — Kambiz Zand
*Assistant Examiner* — Phuc Pham
(74) *Attorney, Agent, or Firm* — Workman Nydegger

(57) ABSTRACT

One example method includes continuously performing key related operations. Each data set in a storage system is encrypted with a different key. New keys are repeatedly introduced and new data is encrypted only with the newest or latest key. Data being rekeyed is re-encrypted with the latest key. By repeatedly introducing new keys and rekeying data sets associated with older keys, the overall key age of the system can be kept low and the data is less susceptible to being compromised.

18 Claims, 9 Drawing Sheets

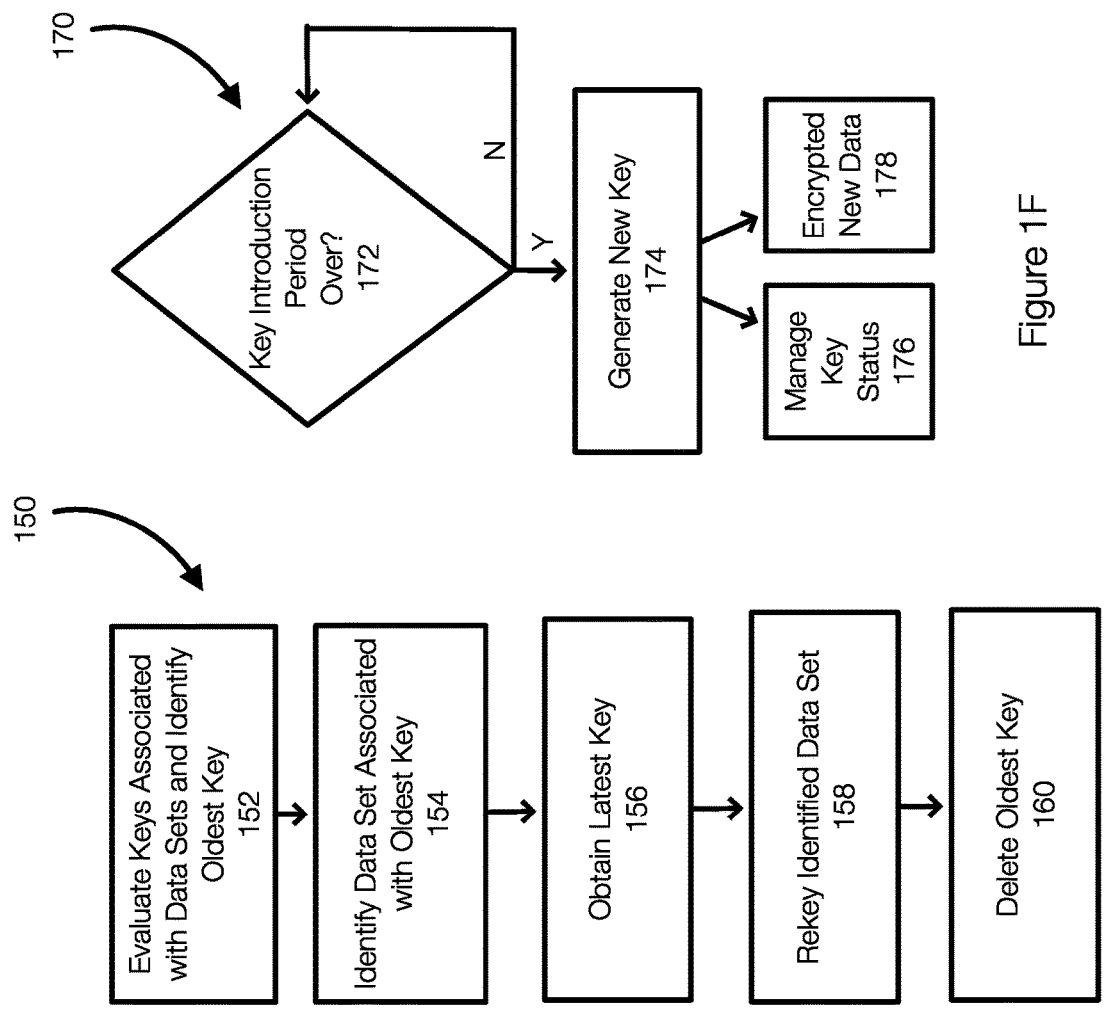

KEY MANAGEMENT AND KEY POLICIES FOR DATA ENCRYPTION IN A STORAGE APPLIANCE

FIELD OF THE INVENTION

Embodiments of the present invention generally relate to data protection and data protection operations. More particularly, at least some embodiments of the invention relate to systems, hardware, software, computer-readable media, and methods for key management operations.

BACKGROUND

Data at rest (e.g., stored in a storage device/system) can be kept private through encryption. A storage system that encrypts its data can prevent unauthorized access, prevent the data from being exposed to an attacker, protect against theft, prevent unauthorized copies or clones from being made, protect from improper disposal, or the like.

Some DARE (data at rest encryption) systems encrypt at rest using a key. Because a key exists, there is a possibility that the data may be breached. The key could be compromised (e.g., stolen, leaked, broken). DARE systems attempt to defend against the risk of a key being compromised by changing the key with which the data is encrypted periodically. This process requires substantial resources and, as a result, is done infrequently.

When a single key is used or when that key is changed infrequently, the entire data set is vulnerable for various reasons. First, a key that exists for a long period of time may become compromised. Even if the key is changed periodically, this process is difficult from a practical standpoint. When a new key is introduced, there is an expectation that all of the data encrypted with the current key will be encrypted with the new key in a prompt manner. This process, however, requires decrypting all of the old data and then encrypting that data with the new key. This all at once encryption is clumsy and requires sweeping across the entire data set. This process can further consume substantial resources and may interfere with other workloads.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 1E discloses aspects of a method for performing a data protection operation such as an key related operation;

FIG. 1F discloses aspects of introducing a new key into a storage system;

DETAILED DESCRIPTION OF SOME EXAMPLE EMBODIMENTS

Figure 1A:
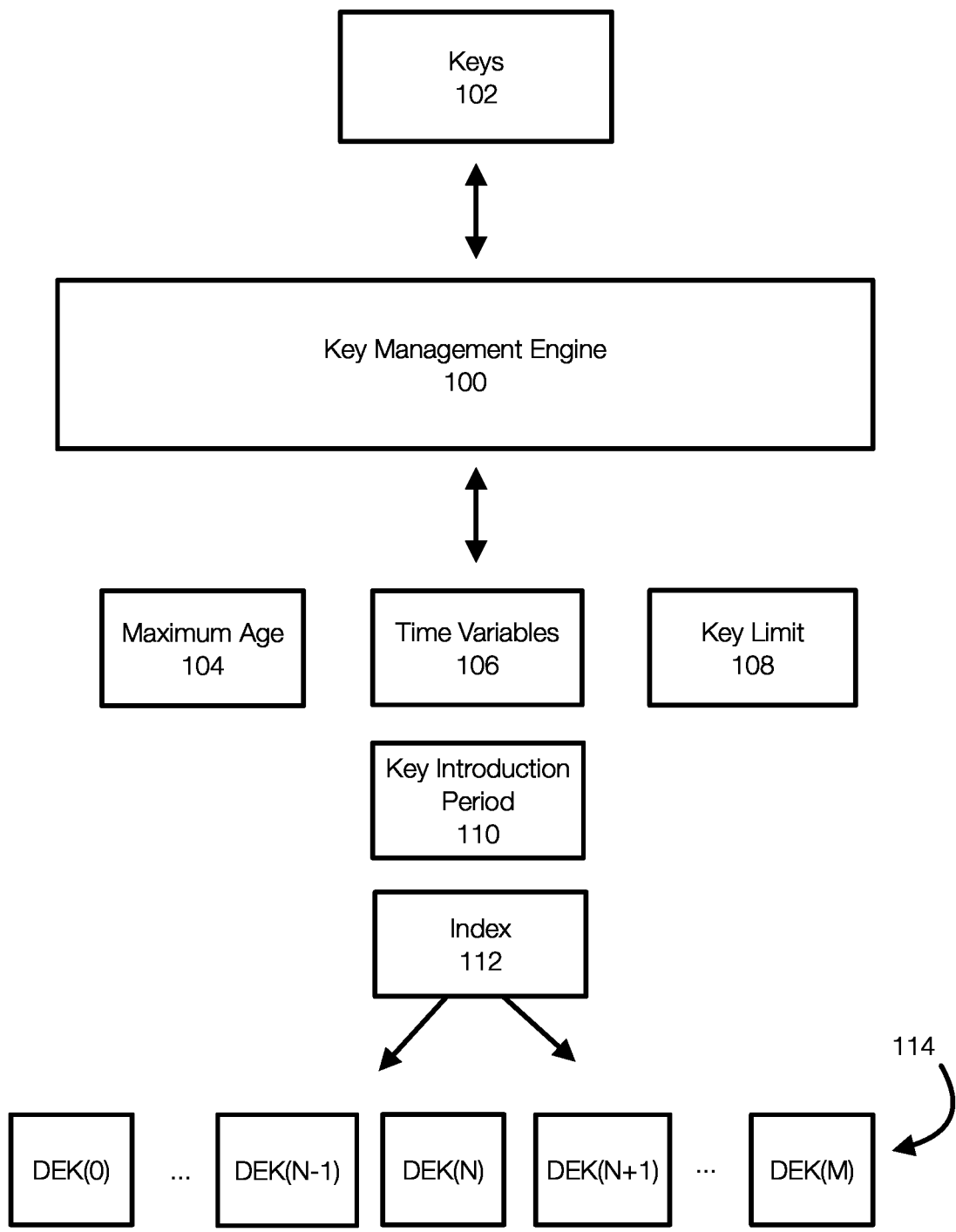
FIG. 1A discloses aspects of key management, key policy, and key usage in a storage system.

Embodiments of the present invention generally relate to data protection, which may include key related operations such as key management operations and key policy operations. More particularly, at least some embodiments of the invention relate to systems, hardware, software, computer-readable media, and methods for key related operations such as, by way of example only, key introduction operations, and key usage operations including rekeying operations, and the like or combination thereof.

In general, example embodiments of the invention, the key related operations and associated policies can be used control the manner in which the data of a storage system is encrypted. The policies may determine when keys are introduced, how many keys are allowed, when data is rekeyed, and the like. These operations may include or be related to both encryption and decryption operations may be performed.

More specifically, key related operations may include, but are not limited to, introducing new keys, rekeying a data set, managing existing keys, decrypting data, encrypting data, or the like. These key related operations can be performed asynchronously and/or synchronously. Further, these key related operations may be performed using system resources that are available (e.g., not being used by another workload). By using available resources or be performing these operations in the background, the system can avoid having to specifically allocate resources to the key related operations, which could impact the performance of other workloads.

Embodiments of the invention operate to ensure that the data of a storage system is encrypted using multiple keys and that the overall or average key age is kept low, for example below a threshold age. This reduces the likelihood that the data or a key will be compromised.

This is achieved, in part, by continually (e.g., periodically) introducing new keys into the storage system. When new data is added to the storage system, the new data is always encrypted with the newest key. When resources (e.g., processor resources, memory resources) are available in the computing system, data encrypted with older keys are rekeyed with the newest key. In one example, only one key at a time is used to encrypt data. Thus, the latest or the newest key is used to encrypt new data and to rekey older data. Because data is also rekeyed, keys no longer needed for decryption purposes can be deleted. The storage system may ensure that, before deleting a specific key, no data is still encrypted with that specific key.

Introducing new keys over time results in a scenario where different portions of the data of the storage system are encrypted with different keys. As previously stated, a system may use multiple keys and each keys is associated with a different set of data. Because data is regularly rekeyed, older keys can be regularly deleted.

Embodiments of the invention ensure (e.g., best efforts) that key related operations are performed using resources that are available in the storage system. In other words, there is no need to consume resources that may be needed for other workloads to perform key related operations. Some operations, such as encrypting new data stored to the storage system, may be performed when necessary rather than waiting for available resources. The introduction of a new key, however, can be performed using available resources.

As used herein, key related operations may include one or more of introducing or adding a new key, encrypting new data with the latest key, rekeying encrypted data with the latest key, deleting older keys, or the like or combination thereof. Further, these operations can be independent of each other and may be performed asynchronously or synchronously.

By using multiple keys, the key related operations may be performed on or with respect to small data sets as previously stated. This helps ensure that the key related operations can be performed using available resources or when resources of the device/system are not otherwise being consumed. By performing these operations when resources are available, these operations are not burdensome on the resources of the storage system and do not interfere with the more primary workloads performed by the storage system.

In one example, a key management engine is provided that is configured to perform or manage key related operations. The key management engine can manage the keys used to encrypt the data and perform the key related operations.

Keys may also be associated with a maximum age. If a key reaches the maximum age, the key management engine may scan the storage system to ensure that no data exists that is encrypted with that key. If such data is found, the data is rekeyed with the latest or newest key. Then, that key may be deleted.

However, data may be rekeyed before any of the keys reach the maximum age. This ensures that the data set associated with the oldest key is encrypted with a key that is no older than a predetermined maximum age and ensures that the overall key age is kept at or below a threshold age. In fact, rekeying can be performed continually, when there are resources available, to smaller subsets of data. Advantageously, it is possible that data sets will be rekeyed before any key reaches the maximum age.

When rekeying a data set associated with a specific key (e.g., the oldest key or the oldest keys), the data set is decrypted with that specific key and then re-encrypted with the latest key. As previously stated, the data set being rekeyed is small in size compared to all the data stored in the storage system and rekeying can be performed using available resources. Once rekeying is completed, the old key can be deleted. However, a check may be performed before deleting that key. The storage system may be scanned for data that is still encrypted with that key and, if found, re-encrypted with the newest key. The old key may then be deleted. If the older key is deleted, any data still encrypted with the deleted key may be lost (e.g., external backups).

The key management engine provides and manages a plurality of keys (e.g., tens, hundreds, or more) such that the key related operations can be applied to smaller sized data sets. This allows the key related operations to be performed using whatever resources are available in the storage system. Advantageously, the key related operations do not become a major undertaking during which resources may be pulled from other workloads. In other words, embodiments of the invention obviate the need to perform a massive decryption/encryption operation on the entire data set and do not consume the resources that would otherwise be required to perform the read, decrypt, re-encrypt, and write operations on the entire data set at the same time.

Advantageously, embodiments of the invention can use any number of keys and a key introduction period can be determined. A new key may be introduced every time the key introduction period ends in one example. The key introduction period may be based on the number of keys or on other factors. By performing key related operations on smaller data sets, the data will be encrypted with progressively new keys. As a result, the overall key age is less than a system where all of the data is rolled over to a new key monolithically.

Each key may be associated with a timestamp. The timestamp allows older keys to be identified. This allows embodiments of the invention to rekey the data set associated with the oldest key or to rekey data sets associated with the oldest keys. Further, introducing a new key and rekeying a data set can be performed asynchronously.

If a maximum age is set and in the event a key reaches the maximum age, all data encrypted with that key is rekeyed with the latest or newest key. There may be situations where the maximum age is changed or the key introduction rate is changed. These changes may introduce a need to rekey multiple data sets. This can be handled by rekeying data sets associated with the oldest keys first. In other wise, the oldest data sets are prioritized for rekeying.

In another example, when rekeying becomes mandatory (e.g., a key reaches the maximum age) and resources need to be allocated for the rekeying operation, embodiments of the invention may prioritize rekeying operations with write operations. These operations may be queued based on priority. For example, write operations (which include data that needs to be encrypted with the latest key) may have a higher priority when writing to primary storage. In another example, write operations may have a lower priority when writing to a secondary storage. The priority policy used may be customizable.

Embodiments of the invention allow key related operations to be performed continuously or repeatedly (e.g., based on a time period, based on number of keys, based on a desired data size for each key) and does not need to be triggered by an event (e.g., a manually initiated event, a security breach). However, key related operations can also be triggered.

FIG. 1A discloses aspects of a key management engine that performs or manages key related operations. FIG. 1A illustrates a key management engine 100 that is configured to manage keys 102 and to perform various key related operations. The keys 102 are examples of data encryption keys (DEKs) that can be used to encrypt/decrypt data.

The keys 102 may be indexed as illustrated by a key index 114, which also represents a lifecycle of the DEKs. The key index 114 may represent or correspond to expired keys, non-expired keys, current or in-use keys, and a latest or newest key. In one example an expired key is one whose age is older than the maximum age. The index 114 includes entries $DEK_0 \ldots DEK_{N-1}$, $DEK_{N-1}$, $DEK_N$, $DEK_{N+1} \ldots DEK_M$. Each entry in the index is or corresponds to a DEK.

The engine 100 may maintain information related to each of the keys individually and/or collectively. For example, the maximum age 104 represents a maximum age of a key. Although data sets are rekeyed before the associated key reached the maximum age, the data set is rekeyed when the associated key reaches the maximum age 104. The active keys (keys currently used and associated with encrypted data in the storage system) should not be older than the maximum age 104. The maximum age 104 is thus the maximum age of a DEK before all data encrypted with that DEK must be rekeyed. This maximum age 104 can be tuned by a user.

The key introduction period 110 refers to a period, measured in time, that triggers the introduction of a new key. For example, the key introduction period 110 may be 1 day (or other time period) and the maximum age may be 6 months (or other time period). In this example, a new key is generated each day and introduced into the storage system. The key introduction operation can be performed independently of other key related operations. This helps ensure that the key related operations can be performed in the background using available resources.

In the event that any of the keys reach the maximum age 104, those keys may be prioritized for a rekeying operation. In one embodiment, data sets are rekeyed before their associated key reaches the maximum age. As previously stated, the keys may never reach the maximum age based on the key introduction period or because data is rekeyed when resources are available. In one example, the key management engine 100 may set a policy that prevents a data set from being rekeyed until the associated key reaches a minimum age. In one example, keys may reach the maximum age by design or because able resources were not available to perform the rekeying operation earlier.

Time variables 106 may be specified or controlled by the key management engine 100. The time variables 106 may be used to control the rates at which key related operations are performed. The time variables 106 may include an uptime. The uptime is how long the system has been configured and operating or, in another example, how long a volume using embodiments of the invention has been configured and operating. In one example, the uptime is the time during which the engine 100 has been up and running. The key limit (L) 108 may refer to the number of keys used or managed by the key management engine 100. More specifically, the limit 108 may refer to the maximum number of keys permitted in the storage system at any given time. In one example, when adding a new key, the limit 158 may require a rekeying operation to be performed such that an older key may be deleted. The index 112 (an expanded index is illustrated as index 114) identifies which keys are expired, current, newer, latest, etc. In one embodiment, the index 112 may identify the latest or newest key, current keys, and/or the age of the keys.

The key management engine 100 may also derive or define certain information related to key related operations. With regard to the index 112, for example, M is a current time interval index, which is increasing stepwise with time.

$$M=\text{floor(uptime/key introduction period)}.$$

N is the oldest time interval index for which the key is not older than maximum age.

The key limit 108 is defined as:

$$L=(\text{maximum age/Key Introduction Period})=M-N+1.$$

Each of the keys may have or be associated with a state. The states may include, by way of example only, expired and deleted, expired and not deleted, current but not newest (current), and newest or latest. The status may be reflected in the index 112.

For keys where $x<N$, the state of the key $DEK_x$ may be expired (or older than maximum age) and deleted. No new data is encrypted with these keys and nothing that was written with these keys is readable. In some embodiments, by deleting these keys, some data will no longer be readable, even if backups are available.

In another example, for keys where $x<N$, the state of the key $DEK_x$ may be older than maximum age but not deleted. In this state, the keys cannot be deleted without losing access to the encrypted data. No new data is encrypted with these keys and it may be mandatory to rekey any data associated with this key. Keys in this state should be retained until all of the data encrypted with these keys that should not be lost has been re-encrypted with a new key $KEK_M$.

Where $N \leq x < M$, the state of the $DEK_x$ keys is current. Data associated with current keys are present in the storage system. No new data is encrypted with current keys. Data associated with current keys may be rekeyed, but rekeying with a new key is not required at as long as the state is current. Because the uptime is continually increasing, current keys ultimately reach their maximum age and change state to, for example expired but not deleted. As previously stated, however, data sets associated with older current keys may be rekeyed before the maximum age is reached.

When $x=M$, the key $DEK_M$ is the latest or the newest key. All new data is encrypted and written to storage using this key. In one embodiment, all rekeying operations use this key $DEK_M$.

Figure 1B:
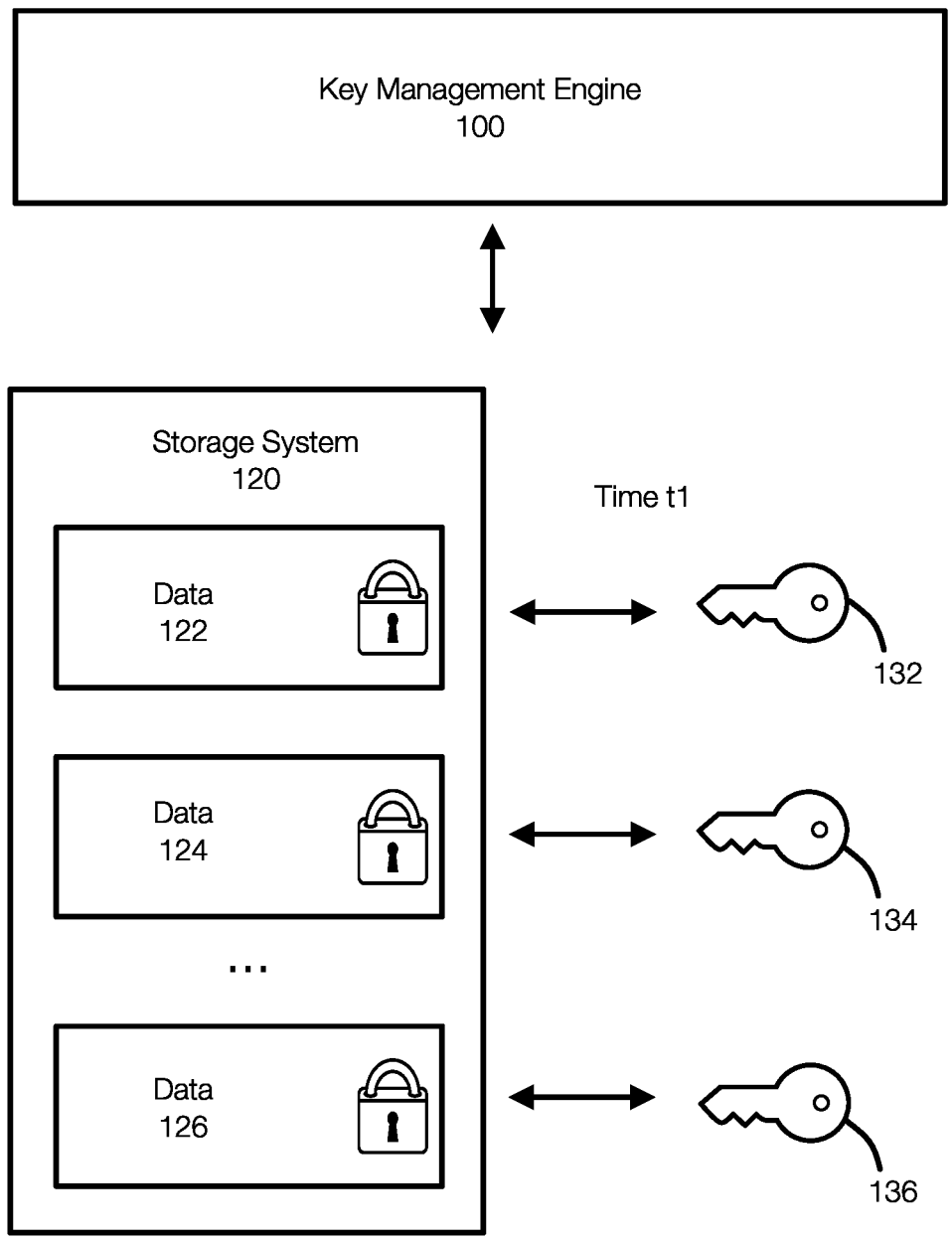
FIG. 1B discloses aspects of key management and illustrates that different portions of the data of a storage system are encrypted with different keys.
Figure 1C:
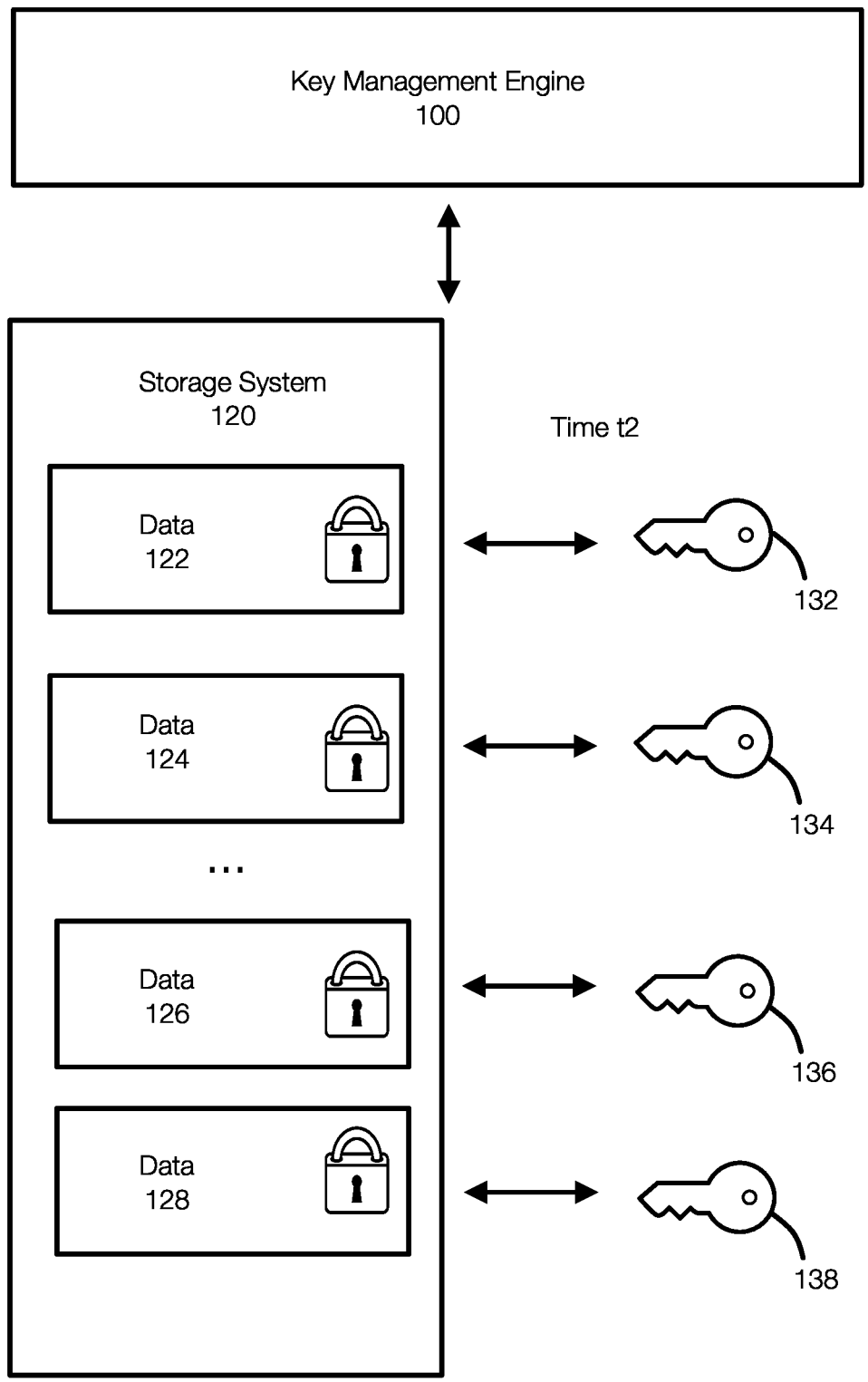
FIG. 1C discloses aspects of introducing a new key into a storage system and encrypting new data with the new key.
Figure 1D:
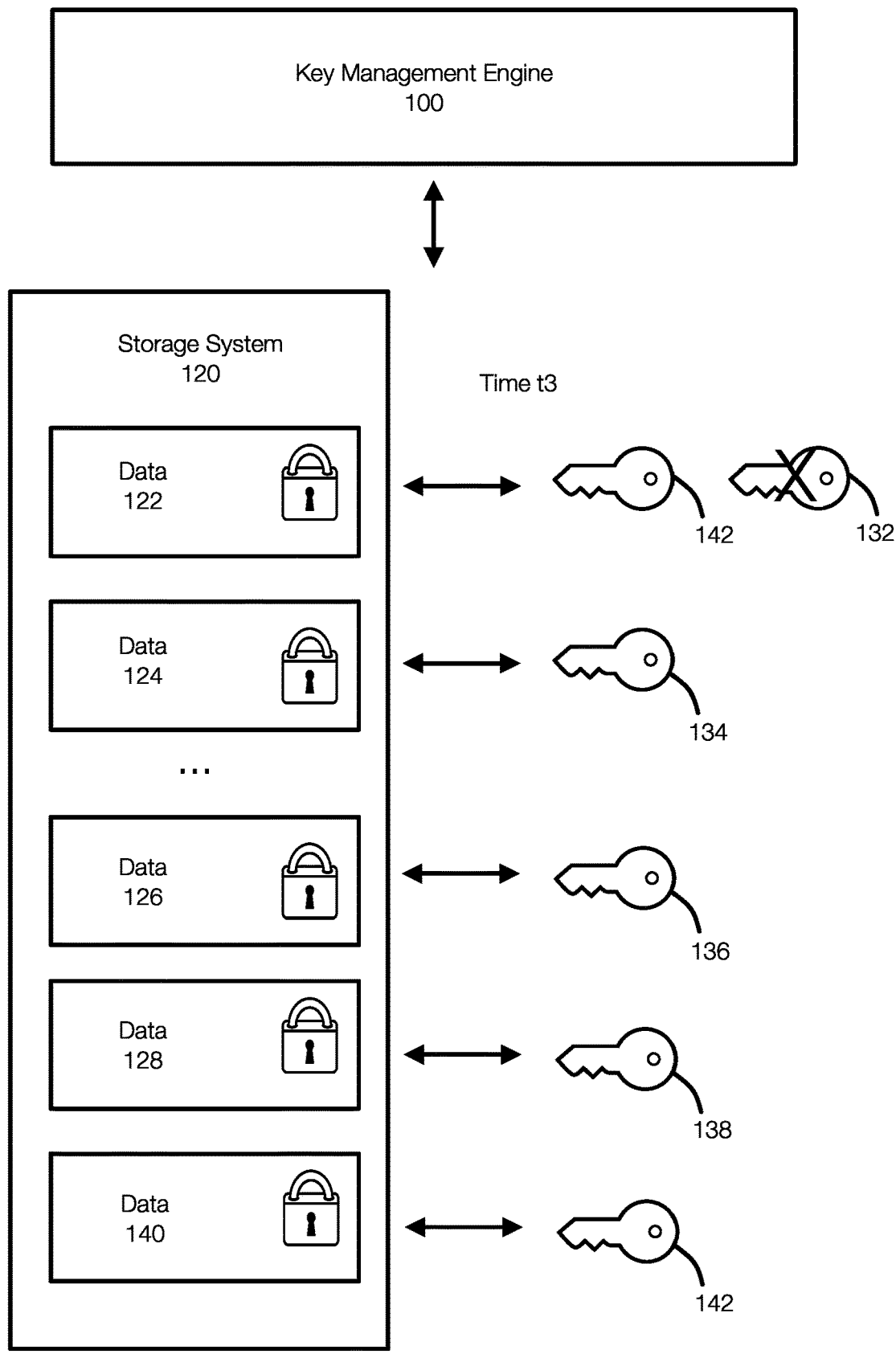
FIG. 1D discloses further aspects rekeying data in the storage system with the newest key.

FIGS. 1B, 1C and 1D disclose aspects of key related operations. FIGS. 1B, 1C, and 1D illustrate a storage system at different points of time to illustrate how keys change state and to illustrate the process of performing key related operations for data sets encrypted with different keys.

FIG. 1B illustrates a key management engine 100. The engine 100 may be a server (including a processor) configured to perform key related operations in the storage system 120, integrated with the storage system 120, an agent or other module operating on the storage system 120, or another device, or the like. The storage system 120 is configured to store data and may include storage devices such as disk drives, flash memory, or the like.

In one example, the storage system 120 and engine 100 are an example of a storage appliance, including hardware such as processors, memory, storage, network hardware, that is configured to perform at least data protection operations.

The following discussion assumes that the data being encrypted is mapped to keys. Examples of mapping data sets to keys are discussed later. In FIG. 1B, only keys whose states are current are illustrated. Other keys and data sets may be present in the storage system 120. At time t1, the key 132 has been used to encrypt the data 122 and the key 134 has been used to encrypt the data 124. The states of the keys 114 and 116 are current but not latest ($N \leq x < M$). The key 136 is the $DEK_M$ key whose state is newest or latest and the key 136 is used to encrypt the data 126. Assuming that the key 136 was introduced at time t1, the data 126 is new data that was added to the storage system 120 after time t1 and was encrypted with the key 136 in this example.

FIG. 1C illustrates the storage device at time t2. At time t2, a new key 138 has been introduced. Thus, a key introduction period has been completed and a new key has been added. The key introduction period is time t2 time t1 in this example. When the key introduction period completes, the state of the key 136 changes from latest to current. New data received after time t2 is not encrypted with the key 136 because the key 136 is no longer the newest or latest key. The newly introduced key 138 is the latest key and is now $DEK_M$. New data 128 is encrypted with the key 138 because the state of the key 138 is latest.

FIG. 1D illustrates the storage system 120 at time t3. At time t3, another key introduction period has been completed and a new key 142 is added. The new key 142 becomes $DEK_M$ and has a state of newest or latest. The state of the key 138 changes from latest to current. In this example, none of the keys 132, 134, 136, and 138 are used to encrypt new data. Only the key 142 is used to encrypt new data.

FIG. 1D also illustrates that the data set 122 has been rekeyed with the latest key 142. In other words, a rekeying operation was performed at some point after time t3 to rekey that data 122 with the latest key 142. Thus, rekeying the data 122 with the latest key 142 could be performed synchronously or asynchronously with the introduction of the key 142 into the storage system 120. More specifically, the storage system 120 may have had resources available that allowed the engine 100 to rekey the data 122. After rekeying the data 122 and ensuring that no data in the storage system is still encrypted with the key 132, the key 132 may be deleted.

In another example, FIG. 1D may also illustrate a situation where a key is found whose age has reached maximum age. In this example, the key management engine 100 may have determined that the key 132 has reached the maximum age. As a result, a rekeying operation is performed and may be mandatory. More specifically, rekeying the data 122 when the key 132 reaches the maximum age may be mandatory and is not dependent on the availability of resources in the storage system 120. However, available resources can still be used. If desired, the state of the key 132 changes from current to expired but not deleted if the key 132 is not deleted. The key management engine 100 may decide to delete the key 132 at a later time.

In one example, the ages of the keys 102 are evaluated by the key management engine 100. In this example, data sets associated with keys that have reached maximum age are rekeyed. Data sets for keys whose age is close to the maximum age may be rekeyed. Data may be rekeyed in order to keep a collective or average key age below a threshold age. In one example, data associated with older keys such as keys that are close to the maximum age or that are older than maximum age may be rekeyed regardless of whether there are spare resources available. This helps improve security by helping keep the average key age down.

In another example, when refreshing keys, identifying keys to refresh (i.e., identifying the oldest keys) may consume some resources. As a result, embodiments of the invention may identify multiple keys in a single sweep and rekey multiple data sets at the same time. When rekeying multiple data sets, all of the data sets are rekeyed with the latest or current key. In this example, embodiments of the invention may introduce a new key after rekeying a data set such that the overall number of keys being managed remains the same and such that the data associated with a specific key is not larger than a threshold size if a threshold size is set. By way of example only, there is only one newest key at a time.

Rekeying the data 122 may be performed as follows. First, the data 122 is read and then decrypted with the key 132. The decrypted data is then encrypted with the key 126 and written back to storage. Once all of the data associated with the key 132 has been re-encrypted with the key 142, the key 132 may be deleted, if desired, and the state is changed to expired and deleted. In one example, the key 132 is not deleted and the state of the key 132 is first changed to expired but not deleted to prevent data loss. Typically, the key 132 is not deleted until all of the data encrypted with the key 132 has been re-encrypted with the current key 142.

After this rekeying operation of after a certain time period, the key 132 may be deleted and the state may be changed.

In some embodiments, new encryption keys may be introduced in accordance with a key introduction period (e.g., daily, weekly, or other period). Embodiments of the invention, by keeping and managing a few hundred keys in one example, allows the key related operations to be performed consistently, in the background and as resources become available.

Because a relatively small amount of data is encrypted with any one key, it is possible to crypto-erase a particular piece of data D, that was encrypted with key j, by looking for all data (other than D) encrypted with j, re-encrypting all other data with the newest key, and then deleting key j. In this example, the data D is not re-encrypted with the newest key and, when the key j is deleted, the data D is crypto-erased. Garbage collection may be performed to reclaim the space if necessary.

Embodiments of the invention can provide a storage system or device that has all data encrypted with a key no older than the maximum age or an age that is less than the maximum age.

Embodiments of the invention minimize the wasted effort of re-encryptions for active data sets which frequently have overwrites or erasures because any block that has been overwritten will have been encrypted with the newest or latest key. Plus, the ability to perform operations on smaller sized data sets does not incur unreasonable system load or any downtime to satisfy the maximum age constraint, even when input parameters are changed dynamically.

FIG. 1E discloses aspects of a method for performing a rekeying operation in a storage system. Before performing the method 150, some initialization steps may be performed, particular when the system is initialized for the first time. For example, initializing a data set may require the maximum age and the key introduction period to be set. Other values may be derived from the maximum age, the key introduction period, and uptime.

For example, the maximum number of keys may be determined by maximum age/key introduction period. Stated differently, the overall data set may be divided into a number of data sets that may be the same as the limit L. Alternatively, a system may be initialized using a single key. Over time as new keys are introduced based on the key introduction period, the number of current keys may grow to the limit. Once the system is up and running, at least one key is used for each individual data set. If the limit on number of keys is reached, it may be necessary perform a rekey operation when a new key is introduced. However, because keys are introduced frequently or in accordance with a predetermine schedule or period and because rekeying is performed in the background on comparatively small data sets, the number of current keys used in a storage system may not reach the limit on the number of keys.

The method 150, during normal operation after the system is initialized, may begin by evaluating 152 the keys managed by the key management system. For example, the oldest key or set of oldest kays may be identified using the key age of each key. Assuming that the oldest key is identified (the method can easily expand to simultaneously or as resources permit, performing a rekey operation on multiple data sets), the data set associated with the oldest key is also identified 154. This may be done using the mapping disclosed with respect to FIG. 2 below. In one example, metadata can be examined to identify each data that is encrypted with the oldest key.

Next, the latest or newest key is identified 156 or obtained. Once the newest key is obtained, the identified data set is rekeyed 158 using the newest key.

The rekey operation illustrated in FIG. 1E may be similarly performed when a key is identified that has reached the maximum age. The data is identified and rekeyed 158. The rekeying operation may include reading the data set, decrypting with the associated key, re-encrypting the data set with the newest key, and writing the refreshed data to storage.

When evaluating 152 the keys, various criteria can be set for selecting a key. As previously stated, the oldest or a set of oldest keys may be selected. Keys that are near or have passed the maximum age may be selected. Embodiments of the invention may not rely on a particular key age when selecting a data set to rekey. More specifically, because the rekeying process is performed using available resources, embodiments of the invention may be proactive and perform rekey operations when available. This may cause the data sets to be rekeyed at different times relative to the corresponding key age. However, once a key reaches the maximum age, the corresponding data set is refreshed.

Once a data set is rekeyed, the oldest key may be deleted 160. The oldest key may be deleted before reaching the maximum age.

In one example, keys may expire. However, the expiration date may be later than the maximum age. Plus, any data encrypted with such a key will have been rekeyed and the key will have been deleted before reaching the maximum age or the expiration date. If a system is too busy to perform key related operations, a key might reach the maximum age and might even reach the expiration date. In this case, resources may be specifically allotted to perform the rekeying operation.

FIG. 1F discloses aspects of a key related operation including a key introduction operation. In the method 170, a determination is made as to whether a key introduction period is over 172. If no, the method waits until the key introduction period is over or completed. If Yes at 172, a new key is generated.

When a new key is generated, the statuses of the keys are managed 176. For example, the newly generated key has a status of newest or latest. The status of the most recent latest key is changed to current. If desired and if applicable (e.g., a rekeying may have just completed and a key may have been deleted), the status of other keys can be updated.

The methods 150 and 170 and other key related operations, as previously stated, can be performed asynchronously and independently. Thus, the deletion of a key, or the rekeying of a data set may not coincide with the introduction of a new key. Further, because various factors can be changed such as key limit, maximum age, and other variables, there may be instances when multiple data sets are rekeyed.

Figure 1G:
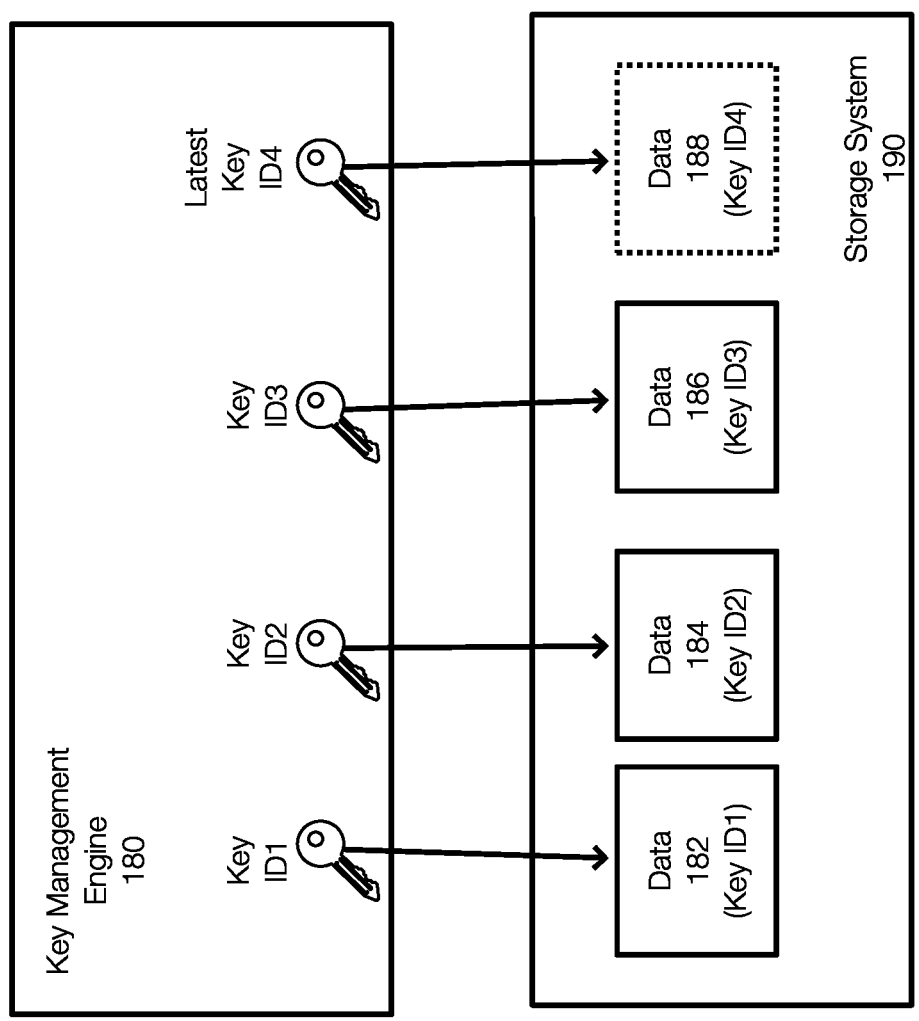
FIG. 1G discloses aspects of relationships between data and keys.

FIG. 1G illustrates relationships between data and keys. The key management engine 180 may be associated with a plurality of keys, illustrated as Key ID1, Key ID2, and Key ID3. The key ID1 has been used to encrypt the data 182 and is associated with metadata identifying the key ID and key age. The mapping is described with respect to at least FIG. 2.

The key ID2 is used to encrypt the data 184 and the key ID3 is used to encrypt the data 186. When rekeying the data 182 that has been encrypted with the key ID1, which is the oldest key in this example, the storage system 190 may be searched to identify the data 182. Once the data 182 is identified, the data 182 can be decrypted with the key ID1 and re-encrypted with the latest key ID4. Thus, the latest key (ID4) is used to encrypt the data 188 (which is the data 182 re-encrypted with the latest key). The key ID1 may be deleted once the data 182 is rekeyed. The key index may be updated with the key status. New data being written to the storage system 190 is also encrypted with the latest key ID4.

Embodiments of the invention, as previously stated, may maintain a relationship between the keys and the encrypted data. Each key is typically mapped to a data set. More specifically, keys whose states are current or latest are mapped to data sets at least because keys whose state is expired and not deleted or expired and deleted may have been removed from the mapping as part of the key related operation or deleted. The mapping can be achieved in various ways.

Figure 2:
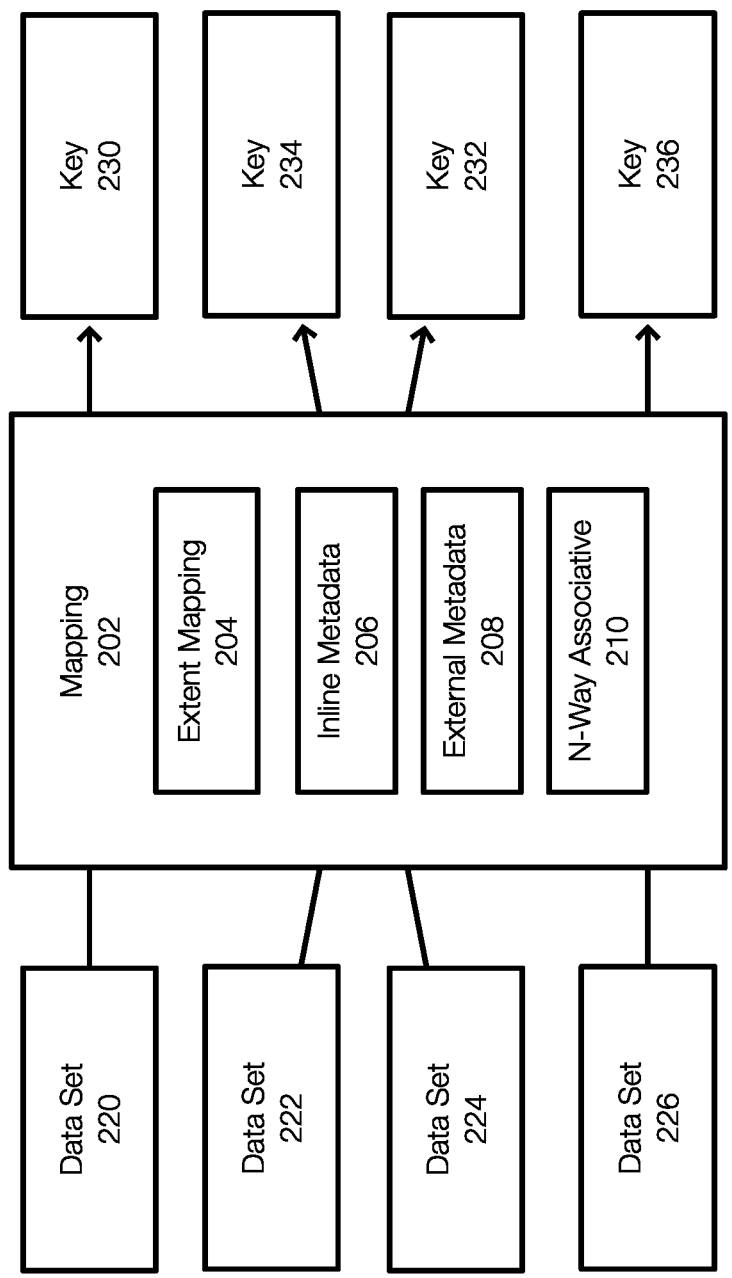
FIG. 2 discloses aspects of mapping keys to data sets in a storage system.

FIG. 2 discloses aspects of mapping data or data sets to keys. The mapping 202 may be maintained by the key management engine. In FIG. 2, the data set 220 is mapped to the key 230, the data set 222 is mapped to the key 232, the data set 224 is mapped to the key 234 and the data set 226 is mapped to the key 236. This example assumes that the key 236 is the current key and that the keys 230, 232, and 234 are current, but not the latest keys. Thus, new data is only encrypted by the key 236.

The mapping 202 can be performed, by way of example only, using extent mapping 204, inline metadata 206, external metadata 208, and N-way associative mapping 210. More generally, mapping simply associates a data set with a key. The key management engine can identify the mapping and key related operations can be performed on the appropriate data once the relevant key is identified, regardless of how the data is stored and regardless of whether the data is contiguous, non-contiguous, on the same physical device, not on the same physical device, or the like.

An extent may be an area of storage. As used herein, an extent may be contiguous or non-contiguous. An extent may also be a logical extent or a physical extent. A storage system may be divided into a number of extents (e.g., extents of blocks, extents of pages). When a write occurs in the storage system, the data is written to the extent associated with the latest key ($DEK_M$). If no extent is associated with the latest key, a new extent may be allocated. A block in that extent is then allocated and the data encrypted with the latest key is written to the allocated block. The extent may be associated with a header or footer that includes a field indicating which key index is used for blocks in that extent. For example, the field may include an entry of $DEK_{25}$, which is $DEK_M$ in this example. Thus, the key corresponding to the index entry 25 is used for that extent. When a new key is added to index entry 26, the state of $DEK_{25}$ changes to current and the state of $DEK_{26}$ is latest.

Another mapping 202 is inline metadata 206 mapping. In inline metadata 206 mapping, each block or page of data is stored with an inline metadata structure including a field indicating the correct key index. The key index is used, for example, when data is read from the corresponding data set. If an overwrite occurs, the data overwriting the old data is encrypted with the latest key and the mapping 202 will reflect this relationship.

External metadata 208 mapping may use a structure such as a tree (e.g., a B+ tree) that is configured to store metadata for each block or page. The metadata may include a field with the key index for the corresponding block or page such that the appropriate key can be identified.

N-Way associative 210 mapping may map the block or page addresses to key indices. For example, if the maximum key age and the key introduction period indicate that 16 keys are used, the target address modulo 16 identifies the key index.

In each of these examples, the mapping can be used to identify what data is encrypted with which key. This allows, when rekeying data associated with an older key, data encrypted with that older key to be identified and rekeyed with the latest key.

Figure 3:
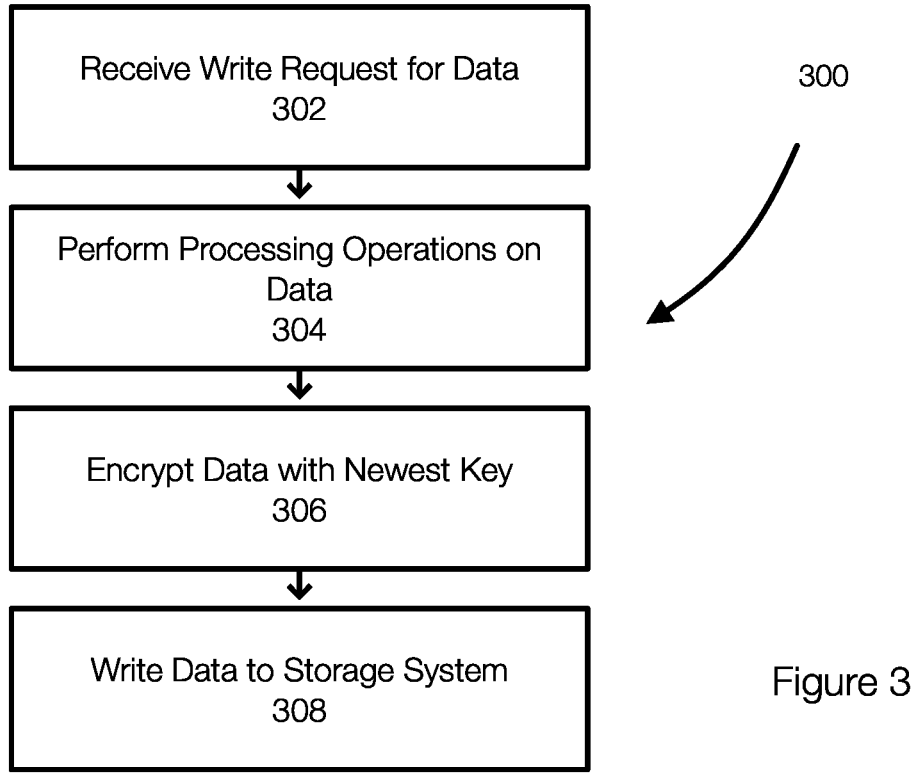
FIG. 3 discloses aspects of writing data in a storage system where key related operations are performed.

FIG. 3A discloses aspects of write operations in a computing system that performs key related operations. More specifically, the method 300 discloses aspects of write operations in a storage system that uses multiple keys to encrypt the data stored therein. A write request to write data is received 302. Next, processing operations may optionally be performed 304 on the data being written. Processing operations may include deduplication operations, compression operations, and the like. In one example, if the data is a duplicate, the data itself need not be written.

Next, the data being written is encrypted 306. The data is encrypted 306 with the latest key $DEK_M$ and written 308 to the storage system. If the location at which the data is written is new (previously unused, the encrypted data is written to the location. If the location is used and is being overwritten, the data being written will not need to be rekeyed immediately because it is encrypted with the latest key. The data being overwritten will not need to be rekeyed because it is overwritten. The mapping metadata may be altered to reflect the overwrite and to ensure that the data being written is associated with the correct key.

When writing 308 data to the storage system, the destination may be new or used and the data may be in a cache or not in the cache. If the destination is unused or unmapped, the data is encrypted with the latest key and written to the new location. If the destination was previously used and is being overwritten, this advantageously eliminates the need to re-encrypt the now overwritten data at a later time. This saves some processing time when rekeying the data set that previously included the now overwritten data.

If the write includes data for a partial block and the data is not in a cache, the current block is read, decrypted with the associated key, and then the affected block is re-encrypted with the latest key. The old block or location is then overwritten with the newly encrypted block. This eliminates the need to rekey the block being overwritten at a later time.

If the write is for data of a full block and the data is out of the cache, the new full block is encrypted with the latest key and the old block is overwritten with the newly encrypted block.

If the write is for data of a partial block or a full block and the partial block or full block is in the cache, the partial or full block is modified, encrypted with the latest key, and the old partial or full block is overwritten.

The key management engine thus maintains a set of encryption keys, one of LU which is the latest key. When idle time is present in the system (e.g., in the background or when resources are available, some of the data may be rekeyed to the latest encryption key (which may change as time advances). Thus, the latest key is used for rekeying operations and for new data. In some examples, also in the background, the data (or the keys) may be searched to find data encrypted with keys that are older than a threshold age (which may be different from the maximum age). When found, the data encrypted with keys older than the threshold age are decrypted with the corresponding older keys and re-encrypted with the latest key. Further, embodiments may perform these operations at a pace to ensure that no data is encrypted with a key older than the threshold age or ensure that data associated with that age is being re-encrypted.

Embodiments of the invention are continuously (e.g., during idle time or when resources are available) ensuring that the data are encrypted with appropriately aged keys. Keys needed to decrypt data are retained at least until all data encrypted thereby have been re-encrypted with the latest or newest key. The keys, even then, may be retained until they reach a maximum age or for other reasons.

Figure 4:
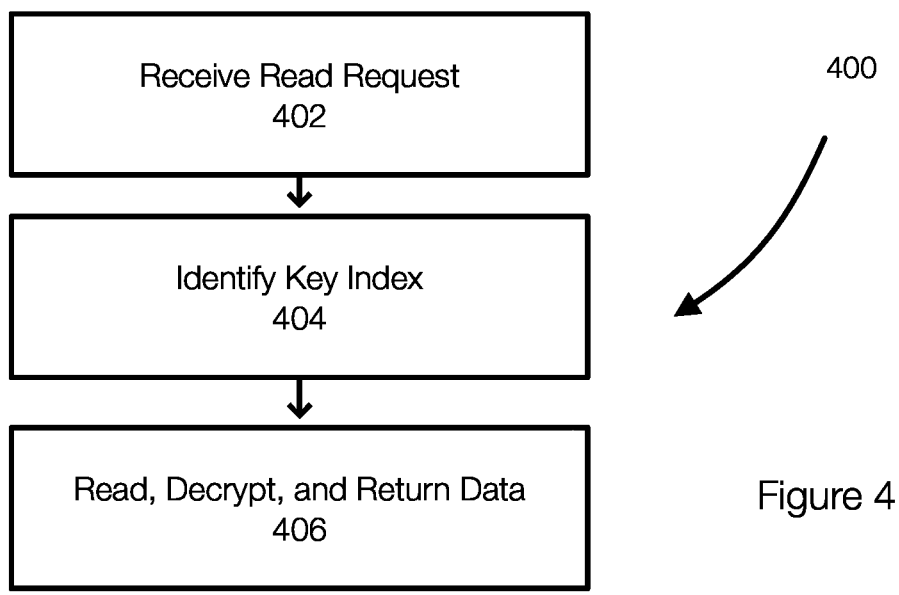
FIG. 4 discloses aspects of reading data in a storage system where key related operations are performed.

FIG. 4 discloses aspects of reading from the storage system. In one example, a read request is received 402. Next, the key index is identified 404 or determined. The key index determined at 404 may depend on the manner in which the data is mapped to the keys. For example, if extents are being used, the header or footer of the extent may be accessed to determine the key index. If external metadata is being used, the metadata structure is read to determine the key index.

Once the key index is determined, the data is read, decrypted with the corresponding key, and returned 406 to the requestor.

There is no need to temporarily stop or pause the read and write operations when performing key related operations at least because the key related operations are performed in the background using resources that are available.

In some examples, an erasure operation may be performed. For example, a user may delete an entire volume or snapshot or other data set. Specific data or blocks may also be erased. In these cases, it may be possible to crypto erase the blocks by deleting the key where possible. However, the data can be erased in other manners, such as by overwriting the data with 0s or 1s. When data is erased, the mappings between the data and the keys can be updated such that no attempt is made to re-encrypt data that has been erased. A bulk operation can eliminate or reduce future re-encryption processes.

As previously stated, part of the key related operation may occur or may be triggered when a key reaches the maximum due to the passage of time or when a user changes the maximum age. When a key reaches the maximum age, the data encrypted that key should be re-encrypted with the latest key $DEK_M$. Satisfying the maximum age requirement may be a best-efforts process in that the process is performed as soon as possible. For example, if multiple keys are expired, the oldest data or data associated with the oldest kay may be rekeyed to the latest key first. Depending on data set sizes, system load, and resources, one or more keys may be processed at a time. In some examples, embodiments of the invention may be proactive and begin the key related operation for keys that are about to reach the maximum age. This allows the engine 100 to take advantage of downtime or other resource availability.

In one example, the maximum age may be reduced (e.g., by a user). In this case, multiple keys may attain the maximum age and a sudden load to perform re-encryptions may be experienced. In this scenario, embodiments of the invention may throttle re-encryptions (the rekeying operation) such that the key related operation does not compete with any new workload. Further, some time may be permitted to perform the rekeying operations as the system adapts to the new maximum age.

Embodiments of the invention may further consider setting or selecting parameters (e.g., maximum age, key introduction period) to account for the type of media. Media that is subject to wear leveling such as flash SSDs, for example, may set the parameters such that the data on the SSD is not rewritten more often that in an expected manner to prevent shortening the life of the SSD.

Once the data processing and re-encryption has completed for a key, the key can be cryptographically shredded to prevent data loss or leakage in the event that a copy of the encrypted data is available. Keys may be retained, however, in the event that certain requirements need to be satisfied, such as permanent auditing or the like.

The key introduction period and the maximum age may be selected such that the maximum age is an integer multiple of the key introduction period. However, the key introduction period should not be close to the maximum age at least because this may cause the system to constantly perform key related operations.

The following is a discussion of aspects of example operating environments for various embodiments of the invention. This discussion is not intended to limit the scope of the invention, or the applicability of the embodiments, in any way.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs.

The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1

A method comprising: maintaining a set of encryption (LU keys by an key management engine, wherein each of the encryption keys is associated with a portion of data stored in a storage system, wherein each of the keys is associated with a key age, when resources are available in the storage system, performing an encryption control operation a first portion of the data encrypted with a first key included in the set of encryption keys such that the first portion of the data is encrypted with a second key, wherein the second key is the newest key introduced in the storage system, and encrypting new data being stored in the storage system with the second key.

Embodiment 2

The method of embodiment 1, further comprising creating a third key when a key introduction period expires, wherein the third key becomes the latest key in the storage system.

Embodiment 3

The method of embodiment 1 and/or 2, further comprising encrypting new data with the third key, wherein no more new data is encrypted with the second key.

Embodiment 4

The method of embodiment 1, 2, and/or 3, further comprising repeatedly introducing a new key into the storage system, wherein the newest key is the latest key used to encrypt new data and used to re-encrypt data associated with older keys being replaced.

Embodiment 5

The method of embodiment 1, 2, 3, and/or 4, further comprising deleting the older keys once all data encrypted with the older keys has been re-encrypted the latest key.

Embodiment 6

The method of embodiment 1, 2, 3, 4, and/or 5, further comprising determining a maximum age for each of the keys and if a key reaches the maximum age, re-encrypting the data associated with that key with the latest key.

Embodiment 7

The method of embodiment 1, 2, 3, 4, 5, and/or 6, further comprising retaining the keys as long as data is encrypted with the keys.

Embodiment 8

The method of embodiment 1, 2, 3, 4, 5, 6, and/or 7, further comprising adding new keys, wherein a latest key is used to encrypt new data, wherein all keys that are not the latest key are not used to encrypt new data once the latest key is generated.

Embodiment 9

The method of embodiment 1, 2, 3, 4, 5, 6, 7, and/or 8, further comprising crypto-erasing a small amount of data encrypted with a fourth key by re-encrypting all data encrypted with the fourth key except the small amount of data with the latest key and deleting the fourth key.

Embodiment 10

The method of embodiment 1, 2, 3, 4, 5, 6, 7, 8, and/or 9, wherein the data includes a plurality of data sets, further comprising mapping each of the data sets to a different key.

Embodiment 11

The method of embodiment 1, 2, 3, 4, 5, 6, 7, 8, 9, and/or 10, further comprising mapping using extents, inline metadata, external metadata, or N-way associative mapping.

Embodiment 12

A method comprising: determining that resources are available in a storage system and are not used by other workloads, using the available resources: evaluating keys associated with a storage system to identify an oldest key; identifying data stored in the storage system that is encrypted with the oldest key; and rekeying the identified data with a newest key.

Embodiment 13

The method of embodiment 12, wherein rekeying the identified data with a newest key includes: decrypting the identified data with the oldest key, encrypting the decrypted data with the newest key, and writing the newly encrypted data to storage.

Embodiment 14

The method of embodiment 12 and/or 13, further comprising encrypting new data added to the storage system with the newest key.

Embodiment 15

The method of embodiment 12, 13, and/or 14, further comprising asynchronously introducing a new key into the storage system, wherein the newest key is the latest key used to encrypt new data and used to rekey data and a status of the previous latest key is changed to current, wherein no further data is encrypted with the previous latest key.

Embodiment 16

The method of embodiment 12, 13, 14, and/or 15, further comprising deleting the oldest key once all data encrypted with the oldest key has been rekeyed.

Embodiment 17

The method of embodiment 12, 13, 14, 15, and/or 16, further comprising determining a maximum age for each of the keys and if a specific key reaches the maximum age, rekeying data associated with specific key, wherein rekeying data may be given a priority with respect to write operations in the storage system.

Embodiment 18

The method of embodiment 12, 13, 14, 15, 16, and/or 17, further comprising allocating resources to rekey the data associated with the specific key.

Embodiment 19

The method of embodiment 12, 13, 14, 15, 16, 17, and/or further comprising prioritizing rekeying operations when multiple data sets are rekeyed.

Embodiment 20

The method of embodiment 12, 13, 14, 15, 16, 17, 18, and/or 19, further comprising crypto-erasing a subset of data encrypted with a specific key by rekeying all data encrypted with the specific key except the subset of data with the latest key and deleting the specific key.

Embodiment 21

The method of embodiment 12, 13, 14, 15, 16, 17, 18, 19, and/or 20, wherein the data includes a plurality of data sets, further comprising mapping each of the data sets to a different key.

Embodiment 22

A method for performing any of the operations, methods, or processes, or any portion of any of these, disclosed herein.

Embodiment 23

A non-transitory storage medium having stored therein instructions that are executable by one or more hardware processors to perform operations comprising the operations of any one or more of embodiments 1-22.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
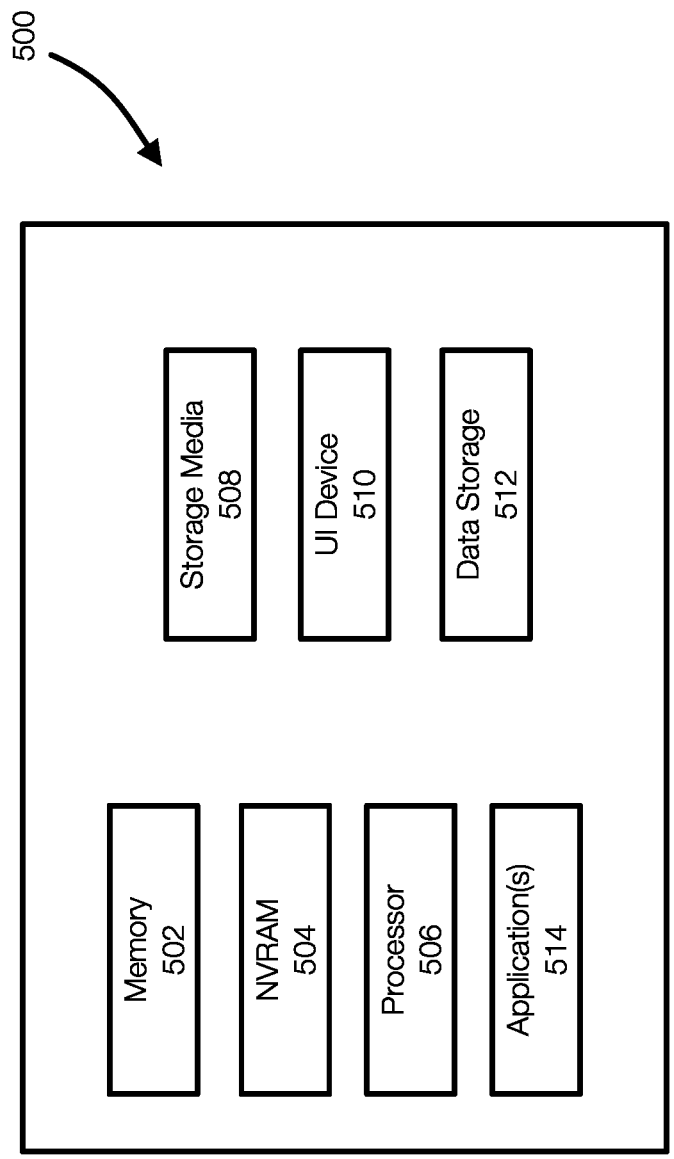
FIG. 5 discloses aspects of an example of a computing system or a storage system.

With reference briefly now to FIG. 5, any one or more of the entities disclosed, or implied, by the Figures and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   determining that resources are available for performing key related operations in a storage system and are not used by other workloads;
   using the available resources:
      evaluating keys associated with a storage system to identify an oldest key;
      identifying data stored in the storage system that is encrypted with the oldest key;
      generating a newest key during a key introduction period, wherein the newest key is the most recently generated key and the key introduction period is a time period that triggers the generation of the newest key and is independent of other key related operations; and rekeying the identified data only with the newest key;

encrypting new data added to the storage system only with the newest key, wherein a length of the key introduction period is configured to manage an amount of data associated with each of the keys and to keep an overall age of the keys below a threshold age.

2. The method of claim 1, wherein rekeying the identified data with a newest key includes:

decrypting the identified data with the oldest key;

encrypting the decrypted data with the newest key; and writing the newly encrypted data to storage.

3. The method of claim 1, further comprising asynchronously introducing the new key into the storage system, wherein the newest key is the latest key used to encrypt new data and used to rekey data and a status of the previous latest key is changed to current, wherein no further data is encrypted with the previous latest key.

4. The method of claim 2, further comprising deleting the oldest key once all data encrypted with the oldest key has been rekeyed.

5. The method of claim 1, further comprising determining a maximum age for each of the keys and if a specific key reaches the maximum age, rekeying data associated with specific key, wherein rekeying data may be given a priority with respect to write operations in the storage system.

6. The method of claim 5, further comprising allocating resources to rekey the data associated with the specific key.

7. The method of claim 1, further comprising prioritizing rekeying operations when multiple data sets are rekeyed.

8. The method of claim 1, further comprising crypto-erasing a subset of data encrypted with a specific key by rekeying all data encrypted with the specific key except the subset of data with the latest key and deleting the specific key.

9. The method of claim 1, wherein the data includes a plurality of data sets, further comprising mapping each of the data sets to a different key.

10. A non-transitory storage medium having stored therein instructions that are executable by one or more hardware processors to perform operations comprising:

determining that resources are available in a storage system for performing key related operations and are not used by other workloads;

using the available resources:

evaluating keys associated with a storage system to identify an oldest key;

identifying data stored in the storage system that is encrypted with the oldest key;

generating a newest key during a key introduction period, wherein the newest key is the most recently generated key and the key introduction period is a time period that triggers the generation of the newest key and is independent of other key related operations; and rekeying the identified data only with the newest key;

encrypting new data added to the storage system only with the newest key, wherein a length of the key introduction period is configured to manage an amount of data associated with each of the keys and to keep an overall age of the keys below a threshold age.

11. The non-transitory storage medium of claim 10, wherein rekeying the identified data with a newest key includes:

decrypting the identified data with the oldest key;

encrypting the decrypted data with the newest key; and writing the newly encrypted data to storage.

12. The non-transitory storage medium of claim 10, further comprising repeatedly introducing the new key into the storage system, wherein the newest key is the latest key used to encrypt new data and used to rekey data and a status of the previous latest key is changed to current, wherein no further data is encrypted with the previous latest key.

13. The non-transitory storage medium of claim 11, further comprising deleting the oldest key once all data encrypted with the oldest key has been rekeyed.

14. The non-transitory storage medium of claim 10, further comprising determining a maximum age for each of the keys and if a specific key reaches the maximum age, rekeying data associated with specific key.

15. The non-transitory storage medium of claim 14, further comprising allocating resources to rekey the data associated with the specific key and prioritizing rekeying operations when multiple data sets are rekeyed.

16. The non-transitory storage medium of claim 10, further comprising crypto-erasing a subset of data encrypted with a specific key by rekeying all data encrypted with the specific key except the subset of data with the latest key and deleting the specific key.

17. The non-transitory storage medium of claim 10, wherein the data includes a plurality of data sets, further comprising mapping each of the data sets to a different key.

18. The non-transitory storage medium of claim 17, further comprising mapping using extents, inline metadata, external metadata, or N-way associative mapping.

* * * * *